July 25, 1933.    H. B. MORRILL    1,919,281
REGULATING MEANS
Filed Feb. 16, 1932    5 Sheets-Sheet 1

Inventor,
Herbert B. Morrill,
by Roberts Cushman Woodbury
Attys.

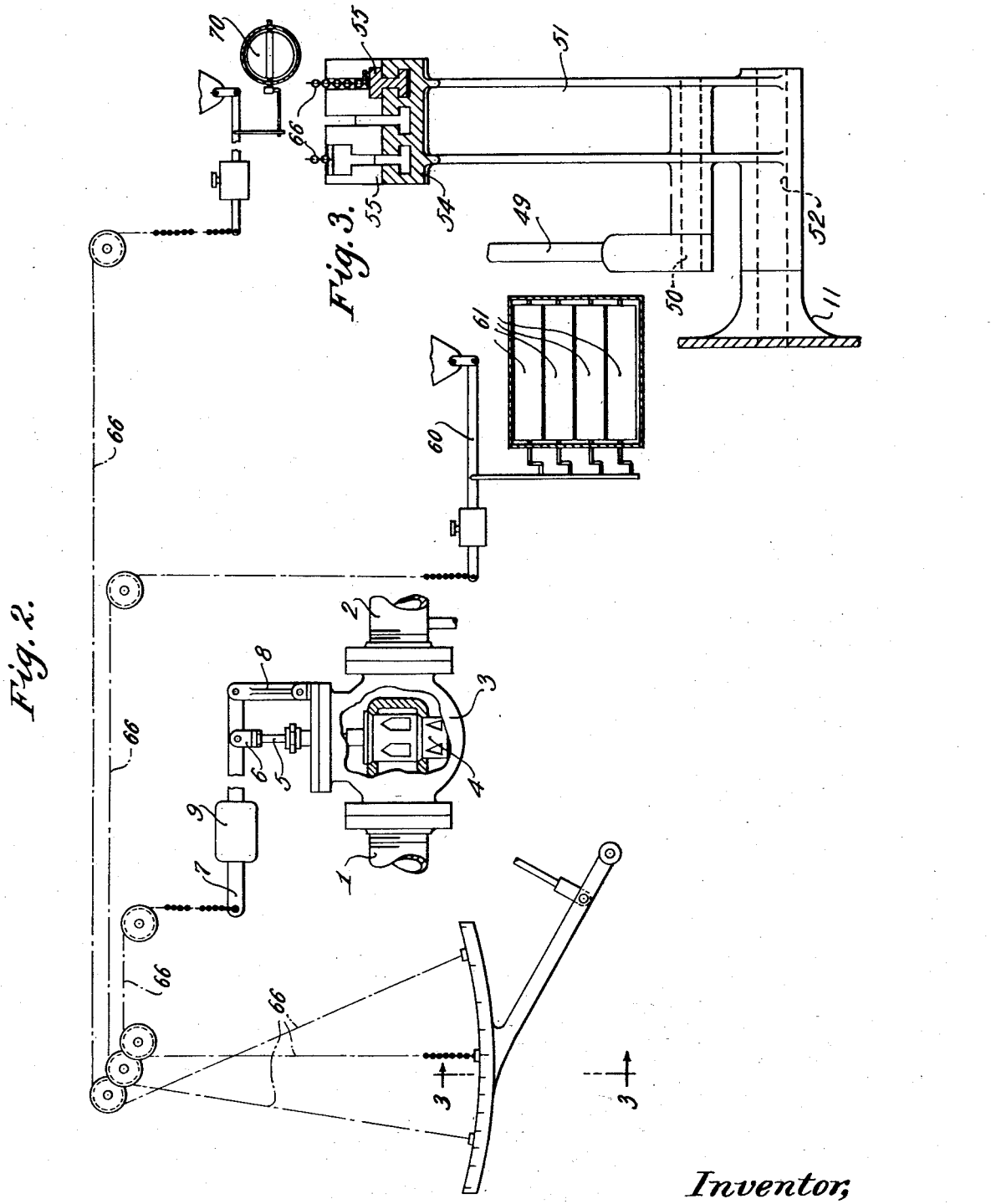

July 25, 1933.  H. B. MORRILL  1,919,281
REGULATING MEANS
Filed Feb. 16, 1932   5 Sheets-Sheet 3

Inventor,
Herbert B. Morrill,
by Roberts, Cushman & Woodberry
Att'ys.

July 25, 1933.  H. B. MORRILL  1,919,281
REGULATING MEANS
Filed Feb. 16, 1932  5 Sheets-Sheet 4
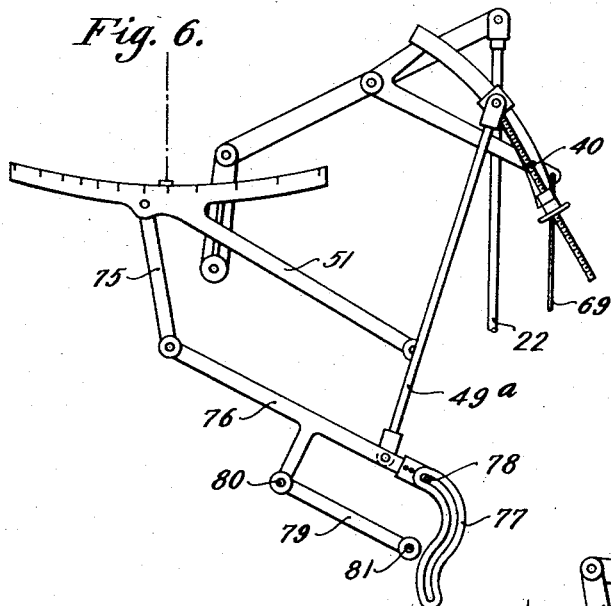
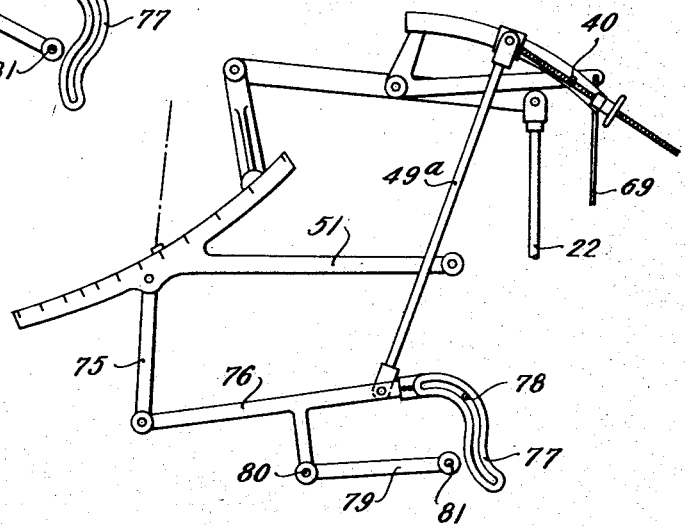
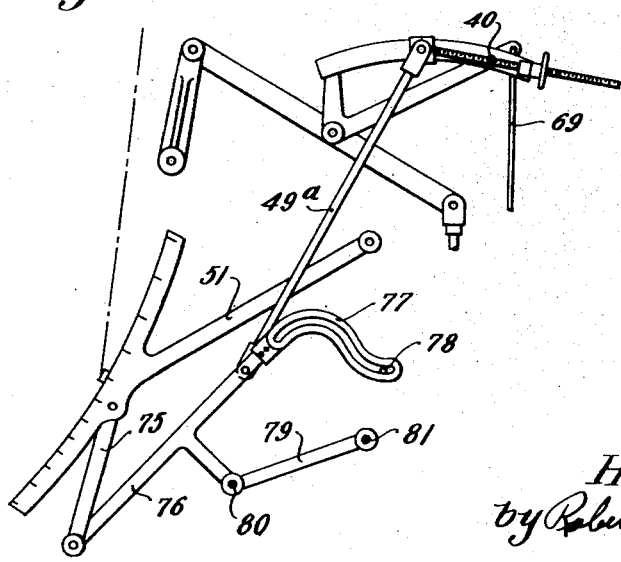
Inventor,
Herbert B. Morrill,
by Roberts, Cushman & Woodberry
Attys.

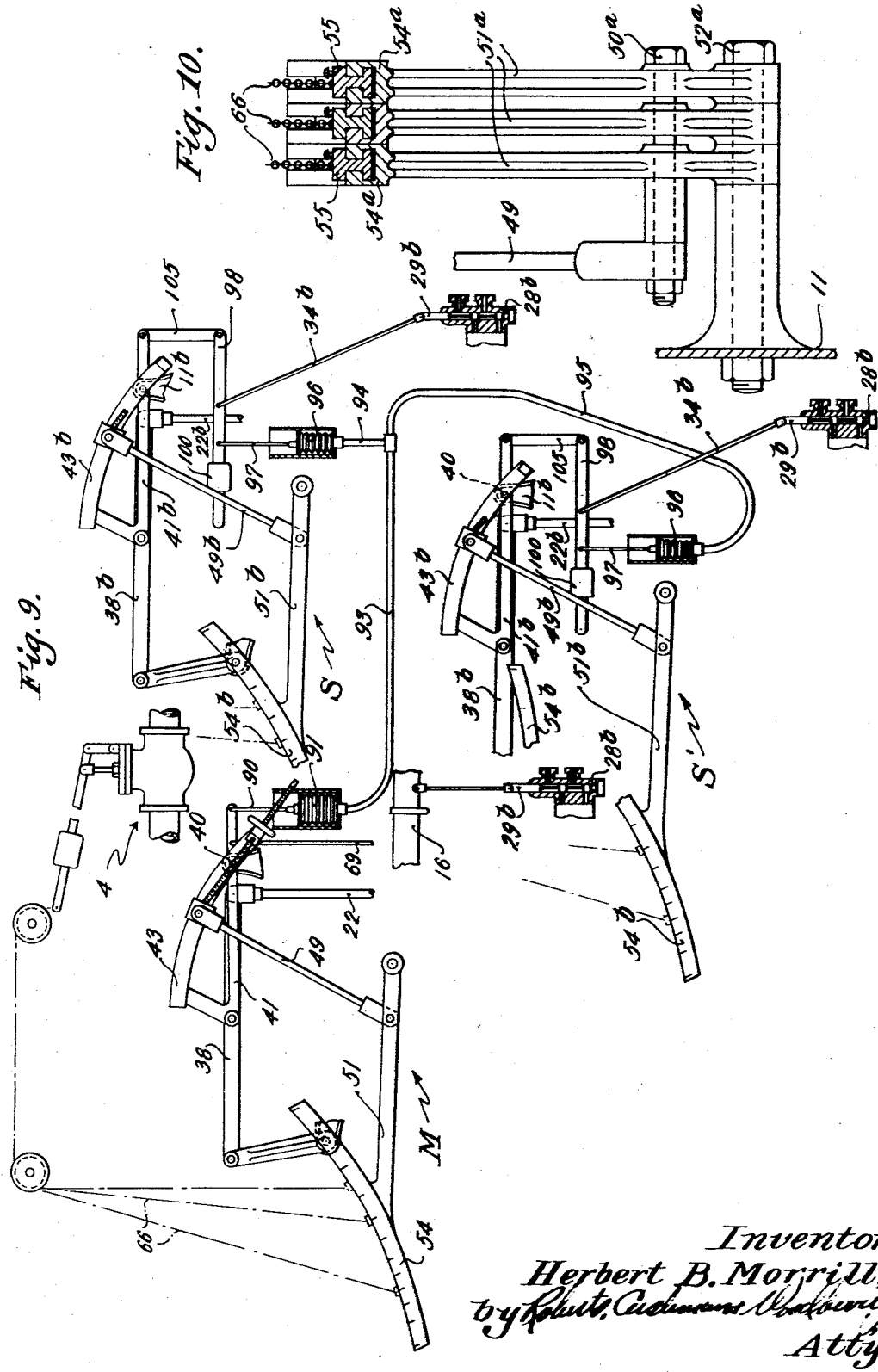

Patented July 25, 1933

1,919,281

UNITED STATES PATENT OFFICE

HERBERT B. MORRILL, OF SALEM, MASSACHUSETTS

REGULATING MEANS

Application filed February 16, 1932. Serial No. 593,279.

This invention relates to pressure actuated control apparatus of the type commonly employed for controlling valves, dampers, etc., and in general provides improved apparatus of this character which may be employed to regulate and properly position a plurality of control elements, such as the damper, draft closure, fuel supply line, fluid outlet pipe, or the like, of a single pressure generating unit or which may be employed to regulate such control elements associated with a plurality of pressure generating units operating together.

My United States Patent No. 1,668,655, filed May 8, 1928, discloses a regulator which is adapted effectively to regulate a suitable control element associated with a pressure generating unit or the like without objectionable tendency toward over-regulation, first in one direction and then in the other with consequent fluctuations in pressure and loss in efficiency, and thus automatically to maintain the pressure in a fluid containing chamber, such as the fluid outlet duct, at a desired point. In accordance with that invention the ratio of movement of the valve or other control element with respect to the travel of the piston of the actuating motor in the control apparatus may be varied through a wide range and with great accuracy. The present invention not only permits these advantages to be maintained, but also affords a wider range of utility for apparatus of this character, permitting a common control member to actuate or regulate a plurality of control elements, these elements, for example, having different velocities, rates of acceleration, or extents of movement between the extremities of their respective paths and yet being suitably coordinated so that they may be regulated in relation to each other to maintain the pressure within the fluid chamber and/or generated by the unit or units at the optimum or desired point with maximum operating economy.

In order to permit these desirable results, I may provide a motor having a fluid actuated piston therein, the piston being connected with suitable linkage including a movable control arm or arms swinging about a single pivot. The arm or arms may have a plurality of tracks therein to receive connections with separate control elements, these tracks being arranged so that the connections may be disposed at different points to permit the movement of the control elements through paths of different lengths in a suitably coordinated manner. When desired, the control arm or arms may be associated with suitable cam means so that the rate of movement of certain or all of the control elements is not uniform but may vary in proportion to the rate of movement of the common control member in different parts of the respective paths of the elements and member. If desired, a master regulator or control member may be movable in response to a common pressure generated by a plurality of units, and suitable control means may be provided to permit the proper regulation of elements associated with the respective units, thereby to permit the pressure to remain at a desired point, while permitting uniform, economical operating conditions in the separate units.

In the accompanying drawings, I have shown certain preferred embodiments of my invention as illustrative of a large number of equivalent mechanisms which might be devised to employ the same general principles and fall within the scope of the appended claims.

In the drawings:

Fig. 2 is a similar view showing the arrangement of connections between the linkage portion of the mechanism and various elements associated with a pressure generating unit;

Fig. 3 is a section through the control arm indicated by line 3—3 of Fig. 2;

Figs. 6, 7 and 8 are similar diagrammatic views illustrating similar various positions of an optional type of linkage;

Fig. 9 is a diagrammatic view of regulator apparatus wherein a master regulator is employed to control the operation of a plurality of pressure generating units; and Fig. 10 is a sectional view corresponding to Fig. 3, but showing an optional control arm arrangement.

Figure 1:
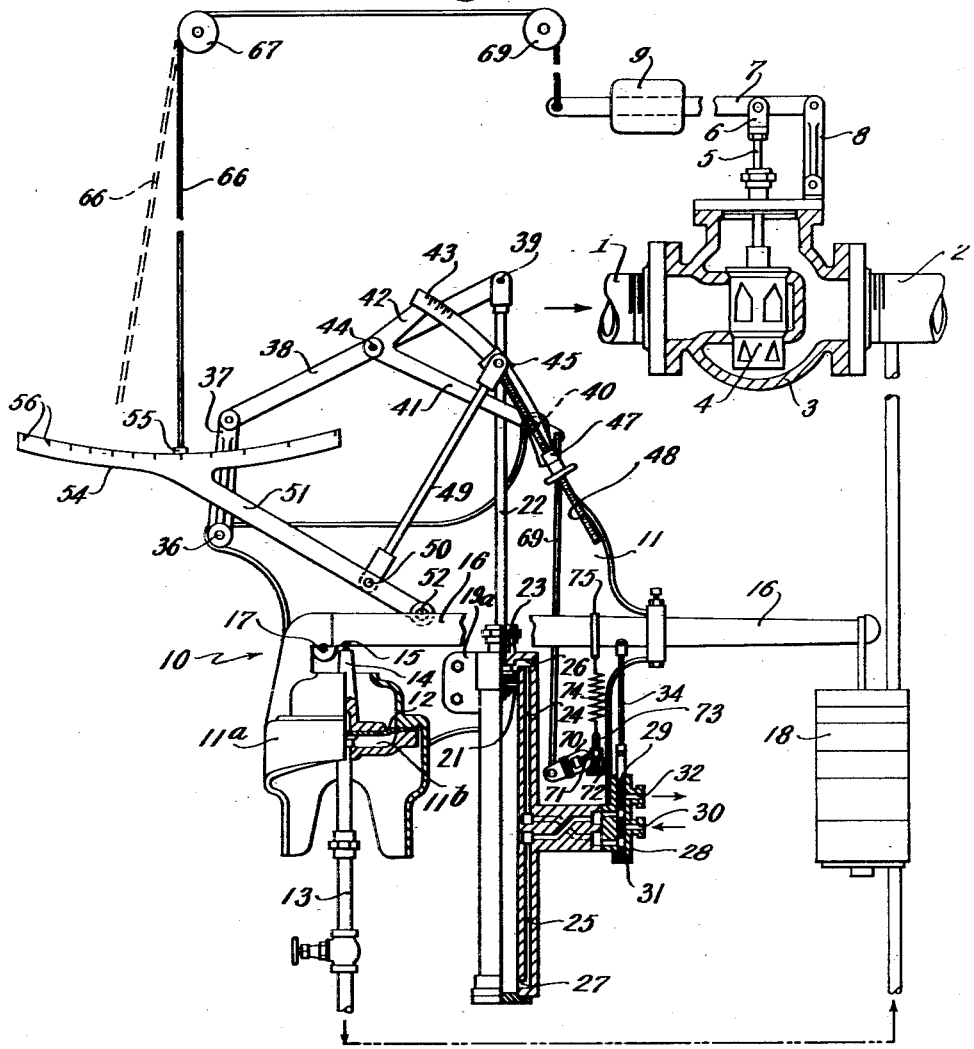
Fig. 1 is a side elevation, somewhat diagrammatic in character, partly in vertical section and partly broken away, illustrating the preferred control mechanism as applied to a pressure reducing valve of a well-known type.

In the accompanying drawings, the numeral 1 indicates one end of a pipe or duct through which steam or other fluid flows from a pressure generating unit or boiler, and the numeral 2 designates an adjoining section of the pipe, illustrative of and hereinafter referred to as the "chamber", in which the pressure is automatically to be controlled. A valve casing 3 is interposed between and connected to the pipe sections 1 and 2. For purpose of discussion, the fluid may be assumed to flow from the section 1 to the section 2, and the valve casing may contain a valve 4 of balanced type having an actuating stem 5 connected by a shackle 6 to a swinging valve lever 7, the latter having one end articulated to the upper end of a rock arm 8 that is pivotally mounted upon valve casing 3. An adjustable counterweight 9 is carried by the lever 7. The valve assembly just described is employed for a convenience of description and illustration as being typical of a control element which may be actuated by apparatus of the character disclosed herein. Such elements, for example, may be pressure reducing valves, dampers, stoker controlling devices, draft closures or fuel supply line valves, which may be referred to generically as control elements and which by their movement either directly or indirectly tend to cause a variation in pressure within a fluid containing pipe or chamber with which they are immediately or remotely associated. Thus the pressure within the pipe section 2 in the accompanying drawings is varied by the position of the control element or valve 4.

The numeral 10 indicates generally the control mechanism which regulates the position of control element 4, this mechanism comprising moving parts, preferably mounted upon a suitable supporting plate or frame 11. Mounted upon or forming a part of this frame is a housing 11$^a$ providing a chamber 11$^b$ which is closed on one side by a movable wall 12, such as a flexible diaphragm or a reciprocating piston. The chamber 11$^b$ is connected by means of a pipe 13 to the pipe section 2 above referred to, it being understood that the controlling apparatus may be located at any convenient and readily accessible point remote from the control element. The diaphragm 12 may be provided with a stem 14 terminating in a knife edge 15, bearing against the lower part of a lever 16 at a point closely adjacent the fulcrum or fixed pivot 17 of the lever. A weight 18 may be secured to the outer end of lever 16 to provide a resistance to upward movement of the lever in response to the pressure acting upon diaphragm 12.

A cylinder 19 may be attached to the frame 11 by a bracket 19$^a$. A piston 21 reciprocates in cylinder 19 and has a rod 22 extending through a stuffing box 23 at the upper end of the cylinder. The cylinder is provided with passages 24 and 25 extending from its upper and lower ends to its central part, these passages terminating in ports 26 and 27 respectively and in a valve housing 28. The latter is provided with a passage in which a double piston valve 29 is slidably mounted; the valve housing has an inlet port 30 to which pressure fluid, for example water or steam, may be admitted from a suitable source and is also provided with an exhaust port 32 at its upper end. An exhaust passage 31 leads from the lower end of the chamber in the valve housing to the exhaust port. Valve 29 is provided with a stem connected by a link 34 to the lever 16, the parts being so arranged that the supply port 30 is connected to the port 27 communicating with the upper part of the cylinder 19 when the lever 16 drops, while the pressure fluid is admitted to the other end of the cylinder through the passage 24 when the lever 16 rises.

The frame 11 is provided with a fixed bearing pin 36 for a rock arm 37, to which one end of a link 38 is pivotally connected. The opposite end of link 38 is pivotally connected to the upper end of piston rod 22. The frame 11 also is provided with a bearing element 40 affording a pivotal support for a segmental lever comprising the lower member 41, the outer member 42, and the upper arcuate member 43. This segmental lever is pivotally connected at 44 to the intermediate part of link 38. A slide block 45 is slidably mounted upon the arcuate member 43 of the segment lever, and a screw-threaded rod 48 is pivotally secured at one end of the slide block, the opposite end of the rod passing through a bracket 47 mounted upon the end of the arcuate arm 43. An internally threaded hand wheel may engage the rod 48 so that the position of the block 45 may be varied by movement of the hand wheel.

A radius link 49 is pivotally connected to the block 45 and to the control arm 51. A pintle connection 50 between the radius link and lever 51 is substantially at the center of curvature of the arcuate member 43 so that the block 45 may be moved along the arcuate member without changing the relation between arm 51 and the segment lever. The arm 51 is pivotally supported at 52 upon the frame 11 and its free end is provided with suitable means for connection to the control element or elements.

The lower member 41 of the segment lever preferably is provided with an extension projecting beyond the pivot 40 and the upper end of a link 69 is connected to this extension. The lower end of link 69 is pivotally connected to a rocker 70 that swings upon a fixed support projecting from frame 11. This rocker is provided with an extension arm 71 conveniently formed as a screw-threaded rod adjustable longitudinally of the rocker, and the arm 71 is provided at its end with a nut 72 in which a second screw-threaded rod 73 is adjustably mounted. The upper end of rod 73 is connected by a tension spring 74 to a stirrup 75 on lever 16.

For convenience of illustration, I have shown and explained in the foregoing description apparatus of the type disclosed in my prior Patent No. 1,668,655, it being understood, however, that the details of this apparatus may be varied to suit different conditions. The arm 51 may differ, however, from that illustrated in my prior patent in having a track portion or portions 54 preferably arcuate in form and slidably receiving a connector or connectors 55, suitable markings 56 being provided upon the track portion of the lever to permit the adjustable positioning of the connector or connectors 55, as desired.

Referring to Fig. 3, it is evident that a plurality of connectors 55 may be received in corresponding grooves in the track portion 54, each of the connectors being secured to flexible elements 66, such as cables or chains, which may extend over suitable pulleys 67 to the respective control elements. Thus, for example, as shown in Fig. 1, one element 66 may be connected to the end of the valve lever 7, while, as shown in Fig. 2, one of the elements 66 is thus connected to the valve lever 7, a second connecting member 66 is secured to a swinging arm 60 that is associated with the swinging draft vanes 61, while a third element 66 is operably connected to a damper 70. Since the position of each of the connectors 55 may be varied independently of the others, their linear velocities may be made to differ relatively to one another as the part 51 moves in response to a movement of the piston 21, and thus the several control elements may be caused to move at different rates. These different velocities of movement are useful, for example, in actuating a steam valve, a damper, and an air supply valve for the firebox of a boiler, respectively, since best operation may require one of said control elements to close or open in precedence to another.

Figure 4:
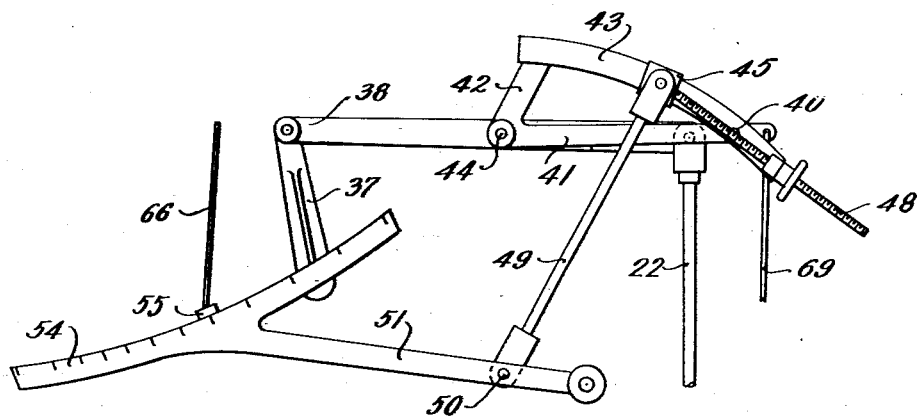
Figs. 4 and 5 are diagrammatic views illustrating the linkage occupying positions corresponding to the mid point, and the lower end of the path of the control member, respectively.
Figure 5:
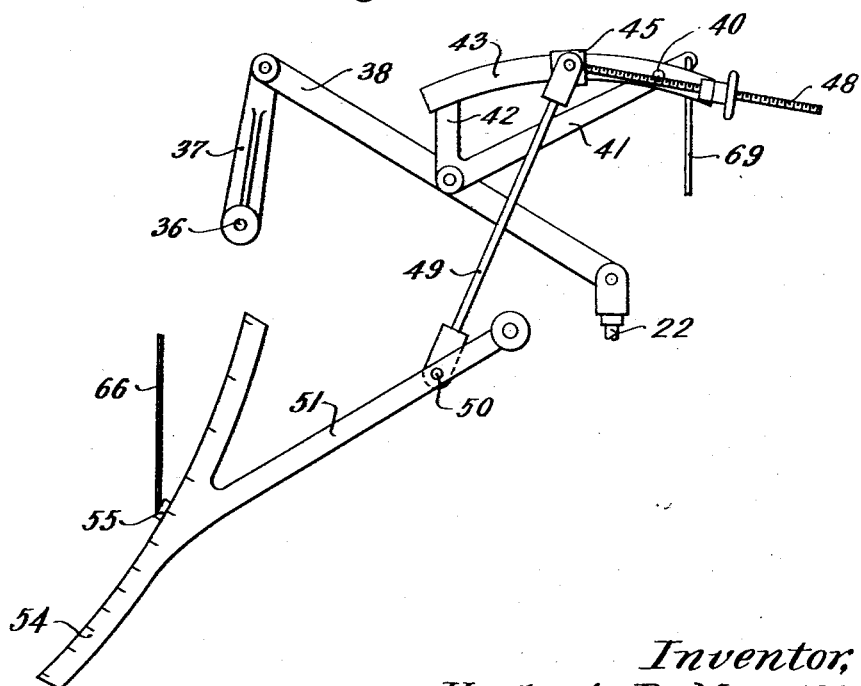

In the operation of apparatus as so far described, it may be assumed that the control elements are the valve 4, the vanes 61, and the damper 70, and that as the valve, the vanes and damper are opened, the pressure in chamber or pipe section 2 gradually increases and that the pressure decreases as these elements are closed. Assuming that the parts are substantially in their closed positions or positions of minimum opening and that the control linkage is positioned as shown in Figs. 1 and 2, the pressure in the chamber $11^a$ is assumed to be substantially atmospheric and the lever 16 under the action of weight 18 has moved to its lowest position, the valve 29 being in such a position as to permit pressure fluid from the port 30 to enter the upper end of cylinder 19. As the pressure fluid enters the upper end of the cylinder, the piston 21 is forced downwardly, and if it makes a full stroke it moves the control arm 51 from the position shown in Fig. 1 to that shown in Fig. 5, moving through the intermediate position illustrated in Fig. 4. Such a downward movement of the lever 51 raises the valve lever 7, thus opening the valve 4 and permitting pressure to increase in pipe 2, while also opening the vanes 61 and the damper 70 to permit combustion to take place in the pressure generating unit at a relatively rapid rate.

As soon as pressure builds up in the pipe section 2, the diaphragm 12 tends to rise, and in response thereto the lever 16 is moved from its lowest position and reaches a point where it is effective in moving valve 29 upwardly to cut off fluid supply to the upper end of cylinder 19. Piston 21 is normally brought to rest before it completes its full downward stroke, but if the pressure in pipe 2 continues to increase, the lever 16 will continue to rise and will permit the valve 19 to move to such a point that it admits pressure fluid into the lower end of cylinder 19 so that the piston 21 is lifted and through the connections described moves the valve 4, the vanes 61, and damper 70 back toward their respective closed positions or positions of minimum opening.

The spring 74 may be provided to prevent over-sensitiveness of the control mechanism, although this feature of the mechanism may be omitted in certain installations. When this feature is employed, the upward movement of piston 21 corresponding to an upward movement of lever 16 causes the extension of lever 41 to rise and lift the link 69, thus tensioning spring 74. The resistance to upward movement of lever 16 thereby is increased so that subsequent increments of pressure in the chamber $11^b$ are opposed by progressively greater resistances acting on lever 16. The operation thus is gradually slowed down so that the control element is not moved to an excessive extent.

The position of a connector 55 upon the lever or control arm 51 may be varied to prevent over-adjustment of the respective control elements and the relative length of the paths of movement of the respective elements 55 may be determined in relation to the length of movement of the respective control elements. The block 45 may be adjusted along the segment lever without causing any simultaneous change in the relative position of the valve and piston, but so that a subsequent movement of the piston is effective in moving the valve a greater or less amount. It is thus evident that the individual elements 55 may be separately adjusted to vary the relative velocity, acceleration, or degree of movement of the connecting elements 66, while the adjustment of the block 45 permits variation of the movement of all of the elements, the proportional relations between the paths of same, however, remaining fixed.

In Figs. 6, 7 and 8, I have illustrated an optional embodiment of the invention wherein the control arm 51 is pivotally connected to a link 75 that in turn is pivotally connected to a swinging cam arm 76, the end of which is provided with a cam groove 77 engaging a fixed or adjustably fixed cam pin or roller 78 mounted upon the frame 11. In this embodiment of the invention, a radius link 49$^a$ (corresponding to the link 49 of Fig. 1) connects the slide block 45 with cam arm 76. The groove 77 may be shaped to provide any desired rate of acceleration in the movement of the lever 51 in response to a given movement of the control member or piston 21. A link 79 is pivotally connected as designated by numeral 80 to the intermediate part of cam lever 76 and has a pivotal connection 81 with the frame 11. With this arrangement the lever 51 rather than having a uniform increment of movement for a corresponding increment of movement of the piston may move different distances in different parts of its path in response to the movement of the piston 21 through equal distances.

Fig. 9 illustrates a further development of my invention which may be employed with a plurality of pressure generating units operated together to provide pressure fluid for one chamber. Thus, for example, this arrangement may be employed with a plurality of boilers connected to a common steam pipe having a valve 4 of the type illustrated in Fig. 1, this valve being associated with the master regulator M which may be of the type shown in Fig. 1 having a piston rod 22 connected to a lever 38 and having a segmental member including an arcuate portion 43, a radius link 49 and a swinging control arm 51. The latter may be connected by a plurality of flexible connections 66 to the control elements, such as the dampers, draft vanes, or the like, of one boiler or pressure generating unit, one such connection going to the valve 4 which regulates the fluid pressure in a pipe or chamber 2$^a$ which receives fluid from all of the boilers.

A plurality of secondary regulating devices, designated by the reference character S, S', etc., may be associated with the master regulator in the manner shown in Fig. 9. For this purpose the end of arm 41 of the segmental member of the master regulator projects beyond its connection with the rod 69 and is connected to a rod 90 which projects upwardly from an expansible-contractible metal bellows 91. This metal bellows forms one part of a closed hydraulic system, being connected by a pipe 93 and its branches 94 and 95 to the bellows 96 of the secondary regulators S, S'. The bellows 96 expands as the bellows 91 contracts and contracts as the latter expands. The upper end of each bellows 96 is connected by a rod 97 to a rock arm 98.

A weight 100, or a spring if preferred, may be employed to counteract the expansion of each bellows 96. A valve rod 34$^b$ is connected to each rock arm 98 in such a way that expansion of the bellows 96 (due to the upward movement of the right-hand end of the arm 38 of the master regulator and upward movement of its piston rod 22) results in the upward movement of the valve 29$^b$ in each secondary regulator. These valves 29$^b$ may be of the same general type as the valve 29 shown in Fig. 1 and may be similarly associated with a cylinder (not shown) having a piston from which a connecting rod 22$^b$ projects. Each rod 22$^b$ is connected to a lever 38$^b$ corresponding to the lever 38 and pivoted to a segmental member 43$^b$ connected by a link 49$^b$ to a swinging control arm 51$^b$ having a track portion 54$^b$ that is connected by flexible elements 66$^b$ to the various control elements of one boiler, for example, in the manner illustrated in Fig. 2. The end of each rock arm 98 is connected by a link 105 with the outer end of the arm 41$^b$ of the segmental member of the corresponding secondary regulator.

In the operation of this apparatus the parts are so arranged that the master regulator is effective through the hydraulic system in causing the control arms 51$^b$ of the secondary regulators to move with the control arm 51 of the master regulator. Thus, when the piston rod 22 of the master regulator rises, the arm 41 of the segmental member is rocked about its pivot 40 to compress the bellows 91 and cause expansion of the bellows 96 in each secondary regulator, thus resulting in upward movement of the corresponding valve 29$^b$ and permitting the admission of pressure fluid to the cylinder of the secondary regulator to lift the piston and piston rod 22 thereof, thus causing a movement of the lever 38$^b$ and control arm 51$^b$ corresponding to that of members 38 and 51 respectively of the master regulator.

The track portion 54$^b$ of each of the control arms 51$^b$ may be connected by connecting elements 66$^b$ to the control elements of a different boiler so that each boiler may be operated under conditions exactly similar to those under which the boiler controlled by the master regulator is operating. It is evident that instead of the linkage arrangement shown in Fig. 1, the control arms 51 and 51ᵇ might be associated with cam arms of the type shown in Figs. 6, 7 and 8 and that in either case the synchronous operation of the regulators would be similar.

Fig. 10 illustrates an optional arrangement of control arms designated by reference characters 51ᵃ, these control arms being operated by a common link 49 pivotally connected to the arms, as designated by reference character 50ᵃ and pivotally mounted on the frame 11, as designated by numeral 52ᵃ. Thus, rather than providing a single arm 51, as shown in Fig. 3, a plurality of arms 51ᵃ may be provided with track portions so that the exact number of arms employed in any regulator may be varied in accordance with the number of control elements which are to be regulated, at the same time permitting the concomitant use of tracks of different curvature or contour. It is evident that an arrangement of this type may also be employed in conjunction with the arrangement shown in Figs. 7, 8 and 9 or in place of either the control lever 51 or the control levers 51ᵇ of Fig. 9. In certain cases it may be desirable to arrange two connectors 55 in the same track of a single control arm but at different portions of the arm to afford regulation of a control element under different conditions, and I contemplate such an arrangement as being within the purview of this invention.

It is evident that this invention permits the employment of an automatic control apparatus to perform any desired number or substantially all of the control functions which have heretofore been performed manually by steam engine operators to maintain steam at a desired pressure. Thus, my invention does not require the manual adjusting of dampers, stoker controls, draft regulators or the like, but permits all of the control elements affecting the operation of one or more pressure generating units to be operated automatically and at the proper relative rates or amounts to maintain the fluid at a desired pressure with maximum operating economy. Furthermore, such an arrangement may be employed to regulate a series of pressure generating units or boilers which operate together so that uniform operating conditions may prevail and so that the various control elements associated with each unit may be automatically moved in unison to maintain the pressure of fluid therefrom at a desired optimum point.

It should be understood that the present disclosure is for the purpose of illustration only and that this invention includes all modifications and equivalents which fall within the scope of the appended claims.

I claim:

1. Apparatus of the class described comprising a chamber containing fluid under pressure, a plurality of control elements movable to affect the pressure in said chamber, a master regulator having a common control member movable in response to pressure variations in said chamber, connections between said control member and certain of said control elements arranged automatically to move the elements to maintain the pressure in said chamber at a desired point, a secondary regulator including a secondary control member, secondary connections between said secondary control member and certain of said control elements, and connecting means between the first-named regulator and said secondary regulator causing the synchronous operation of the common control member and the secondary control member and the simultaneous movement of the control elements connected to the first-named regulator and to the secondary regulator.

2. Apparatus of the class described comprising a chamber containing fluid under pressure, a plurality of control elements movable to affect the pressure in said chamber, a master regulator having a common control member movable in response to pressure variations in said chamber, connections between said control member and certain of said control elements arranged automatically to move the elements to maintain the pressure in said chamber at a desired point, a secondary regulator including a secondary control member, secondary connections between said secondary control member and certain of said control elements, a closed hydraulic system including an expansible-contractible part associated with the first-named regulator and a contractible-expansible part associated with the secondary regulator, said system causing the synchronous operation of the common control member and the secondary control member and the simultaneous movement of the control elements connected to the first-named regulator and to the secondary regulator.

3. Apparatus of the class described comprising a chamber containing fluid under pressure, a plurality of movable control elements, each operable to affect the pressure in said chamber, regulating means to maintain said pressure at a desired point, said means comprising a part movable in response to variations in pressure in said chamber, a cylinder, a piston in said cylinder, valve mechanism operable by movement of said part to vary the admission of fluid to said cylinder and thus to vary the position of the piston, a piston rod secured to the piston, linkage operable by said rod, said linkage including a lever having one end articulated to the rod and having its other end articulated to a swinging support, a swinging member pivotally connected to a fixed supporting part and to the intermediate part of said lever, a link pivotally connected to said member, swinging means articulated to the opposite end of said link, and a plurality of flexible connections secured to said swinging means and connected to said control elements, whereby the movement of said swinging means is effective simultaneously to vary the position of the control elements.

4. Apparatus of the class described comprising a chamber containing fluid under pressure, a plurality of movable control elements, each operable to affect the pressure in said chamber, regulating means to maintain said pressure at a desired point, said means comprising a part movable in response to variations in pressure in said chamber, a cylinder, a piston in said cylinder, valve mechanism operable by movement of said part to vary the admission of fluid to said cylinder and thus to vary the position of the piston, a piston rod secured to the piston, linkage operable by said rod, said linkage including a lever having one end articulated to the rod and having its other end articulated to a swinging support, a swinging member pivotally connected to a fixed supporting part and to the intermediate part of said lever, a link pivotally connected to said member, swinging means articulated to the opposite end of said connecting link, and a plurality of flexible connections secured to said swinging means and connected to said control elements, whereby the movement of said swinging means is effective simultaneously to vary the position of the control elements, said swinging means including track portions upon which the connections may be adjustably fixed to permit individual variation in the length of the paths of movement of said connections in response to a given movement of the piston.

5. Apparatus of the class described comprising a chamber containing fluid under pressure, a plurality of movable control elements, each operable to affect the pressure in said chamber, regulating means to maintain said pressure at a desired point, said means comprising a part movable in response to variations in pressure in said chamber, a cylinder, a piston in said cylinder, valve mechanism operable by movement of said part to vary the admission of fluid to said cylinder and thus to vary the position of the piston, a piston rod secured to the piston, linkage operable by said rod, said linkage including a lever having one end articulated to the rod and having its other end articulated to a swinging support, a swinging member pivotally connected to a fixed supporting part and to the intermediate part of said lever, a link pivotally connected to said member, swinging means articulated to the opposite end of said link, a plurality of flexible connections secured to said swinging means and connected to said control elements, whereby the movement of said swinging means is effective simultaneously to vary the position of the control elements, said swinging member having an arcuate portion with the center of its curvature substantially at the axis of the connection between the link and said swinging means, and a slidable part upon said arcuate portion pivotally engaging the connecting rod to permit the position of the rod in relation to the swinging member to be varied, thus to vary the relative accelerations of motion of the swinging means and of all of the control elements in response to a given movement of the piston.

6. Apparatus of the class described comprising a chamber containing fluid under pressure, a master regulator including a control member movable in response to variations in pressure in said chamber, a part connected to said control member and movable in response thereto, a control arm operably associated with said part, connecting elements associated with said control arm and extending therefrom, a plurality of control elements actuated by said connecting elements to affect said pressure, a secondary regulator including a rock arm, connecting means between said part and said rock arm causing similar movements thereof, a secondary control member movable in response to movement of said rock arm, a secondary control arm movable in response to movement of said secondary control member, and connections extending from said secondary control arm to move additional control elements operable to affect the pressure in said chamber.

7. Apparatus of the class described comprising a chamber containing fluid under pressure, a plurality of movable control elements, each operable to affect the pressure in said chamber, regulating means to maintain said pressure at a desired point, said means comprising a part movable in response to variations in pressure in said chamber, a cylinder, a piston in said cylinder, valve mechanism operable by movement of said part to vary the admission of fluid to said cylinder and thus to vary the position of the piston, a piston rod secured to the piston, linkage operable by said rod, said linkage including a lever having one end articulated to the rod and having its other end articulated to a swinging support, a swinging member pivotally connected to a fixed supporting part and to the intermediate part of said lever, a link pivotally connected to said member swinging means articulated to the opposite end of said link, a plurality of flexible connections secured to said swinging means and connected to certain of said control elements, a secondary regulator including a secondary piston and secondary piston rod secured thereto, a secondary linkage operable by said secondary piston rod and including a secondary lever having one end articulated to the secondary piston rod and having its other end articulated to a secondary swinging support, a secondary swinging member pivotally connected to a fixed supporting part and to the intermediate part of said secondary lever, a secondary link pivotally connected to said secondary swinging member, swinging means articulated to the opposite end of said secondary connecting link, a flexible connection extending from said secondary swinging means to actuate another of said control elements, a rock arm, connecting means between said first-named swinging member and said rock arm arranged to effect simultaneous movement thereof, secondary valve mechanism associated with the secondary cylinder and connected to said rock arm, and a link connecting said rock arm and said secondary swinging member, whereby the movement of the secondary swinging means is similar to that of the first-named swinging means due to the synchronous movement of the first-named piston and the secondary piston and due to the link connecting the rock arm and said secondary swinging member.

8. Apparatus of the class described comprising a chamber containing fluid under pressure, a plurality of movable control elements, each being operable to affect the pressure in said chamber, a master regulator and a secondary regulator, each regulator including a cylinder, a piston, valve mechanism operable to vary the admission of fluid to the cylinder and thus to vary the position of the piston, a piston rod secured to the piston, linkage operable by said rod, said linkage including a control arm, connections extending from the control arm of the master regulator to certain of said control elements and connections extending from the control arm of the secondary regulator to other of said control elements, means associated with the valve mechanism of the master regulator to regulate said mechanism in response to pressure variations in said chamber, and connecting means between the master regulator and the valve mechanism of the secondary regulator operable to cause the movement of the valve mechanism of the secondary regulator in synchronism with the movement of the valve mechanism of the master regulator.

HERBERT B. MORRILL.